(12) United States Patent
Pfrenger et al.

(10) Patent No.: US 9,950,567 B2
(45) Date of Patent: *Apr. 24, 2018

(54) WHEEL AND TIRE ASSEMBLY INCLUDING A COLLAPSIBLE WHEEL

(71) Applicant: LINDSAY CORPORATION, Omaha, NE (US)

(72) Inventors: Jochen Pfrenger, The Woodlands, TX (US); Thomas J. Korus, Lindsay, NE (US)

(73) Assignee: Lindsay Corporation, Omaha, NE (US)

( * ) Notice: Subject to any disclaimer, the term of this patent is extended or adjusted under 35 U.S.C. 154(b) by 50 days.

This patent is subject to a terminal disclaimer.

(21) Appl. No.: 15/040,782

(22) Filed: Feb. 10, 2016

(65) Prior Publication Data
US 2016/0159150 A1 Jun. 9, 2016

Related U.S. Application Data

(63) Continuation of application No. 13/969,197, filed on Aug. 16, 2013, now Pat. No. 9,290,054.

(51) Int. Cl.
*B60C 7/24* (2006.01)
*B60C 7/22* (2006.01)
*B60C 25/01* (2006.01)
*B60B 23/10* (2006.01)
*B60B 1/14* (2006.01)
*B60B 25/02* (2006.01)
*B60C 11/03* (2006.01)
(Continued)

(52) U.S. Cl.
CPC .................. *B60C 7/24* (2013.01); *B60B 1/14* (2013.01); *B60B 23/10* (2013.01); *B60B 25/02* (2013.01); *B60C 7/22* (2013.01); *B60C 11/0311* (2013.01); *B60C 25/01* (2013.01); *A01G 25/092* (2013.01); *B60B 23/00* (2013.01); *B60B 2900/212* (2013.01)

(58) Field of Classification Search
CPC .... B60C 7/00; B60C 7/22; B60C 7/24; B60C 7/26; B60B 19/04; B60B 23/00; B60B 23/10; B60B 1/14; B60B 25/02; A01G 25/092
See application file for complete search history.

(56) References Cited

U.S. PATENT DOCUMENTS 1,308,660 A * 7/1919 Clark ...................... B60B 25/02
  152/377
2,147,377 A * 2/1939 Lyons ..................... B60B 25/02
  152/377

(Continued)

*Primary Examiner* — Kip T Kotter
(74) *Attorney, Agent, or Firm* — Hovey Williams LLP

(57) ABSTRACT

A wheel assembly includes a collapsible wheel and an airless flexible tire mounted on the wheel. The wheel includes a central portion and a plurality of circumferentially spaced mounting elements attached to the central portion. Each of the mounting elements is movable between a retracted position and an extended position, and may be pivotally attached to the central portion of the wheel and configured to pivot between the retracted position and the extended position. The tire may be positioned on the wheel when one or more of the mounting elements is in the retracted position, and the one or more mounting elements are moved to the extended position wherein the mounting elements engage and support the tire.

16 Claims, 10 Drawing Sheets

(51) Int. Cl.
    *B60B 23/00*    (2006.01)
    *A01G 25/09*    (2006.01)

(56)            References Cited

U.S. PATENT DOCUMENTS

| 3,730,435 | A  | * | 5/1973  | Zimmerer   | A01G 25/092 |
|           |    |   |         |            | 239/742     |
| 4,921,029 | A  | * | 5/1990  | Palinkas   | B60C 7/12   |
|           |    |   |         |            | 152/11      |
| 6,142,203 | A  | * | 11/2000 | Bickford   | B60C 7/10   |
|           |    |   |         |            | 152/267     |
| 7,594,527 | B2 | * | 9/2009  | Thompson   | B60B 19/04  |
|           |    |   |         |            | 152/175     |
| 9,290,054 | B2 | * | 3/2016  | Pfrenger   | B60C 7/22   |
| 2010/0141018 | A1 | * | 6/2010 | McCue    | B60B 11/02  |
|           |    |   |         |            | 301/5.1     |
| 2010/0201098 | A1 | * | 8/2010 | Fitzsimons | B60B 1/14  |
|           |    |   |         |            | 280/287     |
| 2011/0278911 | A1 | * | 11/2011 | Funaki   | B60B 9/00   |
|           |    |   |         |            | 301/62      |

\* cited by examiner

WHEEL AND TIRE ASSEMBLY INCLUDING A COLLAPSIBLE WHEEL

RELATED APPLICATIONS

The present application is a continuation application and claims priority of previously pending application titled "WHEEL AND TIRE ASSEMBLY INCLUDING A COLLAPSIBLE WHEEL", Ser. No. 13/969,197, filed Aug. 16, 2013, issued as U.S. Pat. No. 9,290,054. The above-identified application is hereby incorporated by reference in its entirety.

FIELD

Embodiments of the present invention relate to wheel and tire assemblies. More particularly, embodiments of the present invention relate to wheel and tire assemblies including collapsible wheels and airless tires presenting certain performance characteristics of pneumatic tires.

BACKGROUND

One type of irrigation system includes elevated water conduits supported by mobile towers. Such mobile towers are mounted on wheels that propel the towers along the ground to be irrigated. The wheels typically include pneumatic tires that require periodic maintenance, including adjusting air pressure, repairing tires that develop holes or other damage, and replacing old or damaged tires that are beyond repair.

Because irrigation systems are typically used in fields or other remote locations, monitoring the tires for problems and reaching the tires to perform maintenance and repairs can be inconvenient or difficult. If a tire loses air pressure and is not repaired in a timely manner, damage to the tire, to the equipment mounted on the tire, or both may result.

One solution to the challenges presented by the use of pneumatic tires involves using wheels without tires. While this approach addresses most of the problems of tire maintenance, repair and replacement, it presents other challenges. Tireless wheels, for example, are rigid and experience greater ground penetration than a flexible tire, thereby creating ruts or otherwise disturbing the land more than a pneumatic tire. Similar problems exist for tractors, automobiles, and other vehicles that typically use pneumatic tires.

The above section provides background information related to the present disclosure which is not necessarily prior art.

SUMMARY

A wheel assembly constructed in accordance with an embodiment of the present invention comprises a wheel and an airless flexible tire mounted on the wheel. The wheel includes a central portion and a plurality of circumferentially spaced mounting elements attached to the central portion. Each of the mounting elements is movable between a retracted position and an extended position and support the tire when in the extended position.

An irrigation system constructed in accordance with another embodiment of the invention comprises a conduit for carrying and dispensing water, at least one mobile tower for supporting and moving the conduit, and a plurality of wheel assemblies for supporting the at least one mobile tower. Each of the wheel assemblies includes a wheel with a central portion and a plurality of circumferentially spaced mounting elements attached to the central portion, and each of the mounting elements is movable between a retracted position and an extended position. An airless flexible tire is mounted on the wheel and is supported by the mounting elements when the mounting elements are in the extended position.

A method of mounting an airless tire on a wheel in accordance with yet another embodiment of the invention comprises moving a plurality of mounting elements on the wheel from an extended position to a retracted position, positioning the wheel and the tire such that the wheel is inside the tire, and moving the plurality of mounting elements from the retracted position to the extended position such that the mounting elements engage the tire.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

DRAWINGS

Embodiments of the present invention are described in detail below with reference to the attached drawing figures, wherein.

Figure 1:
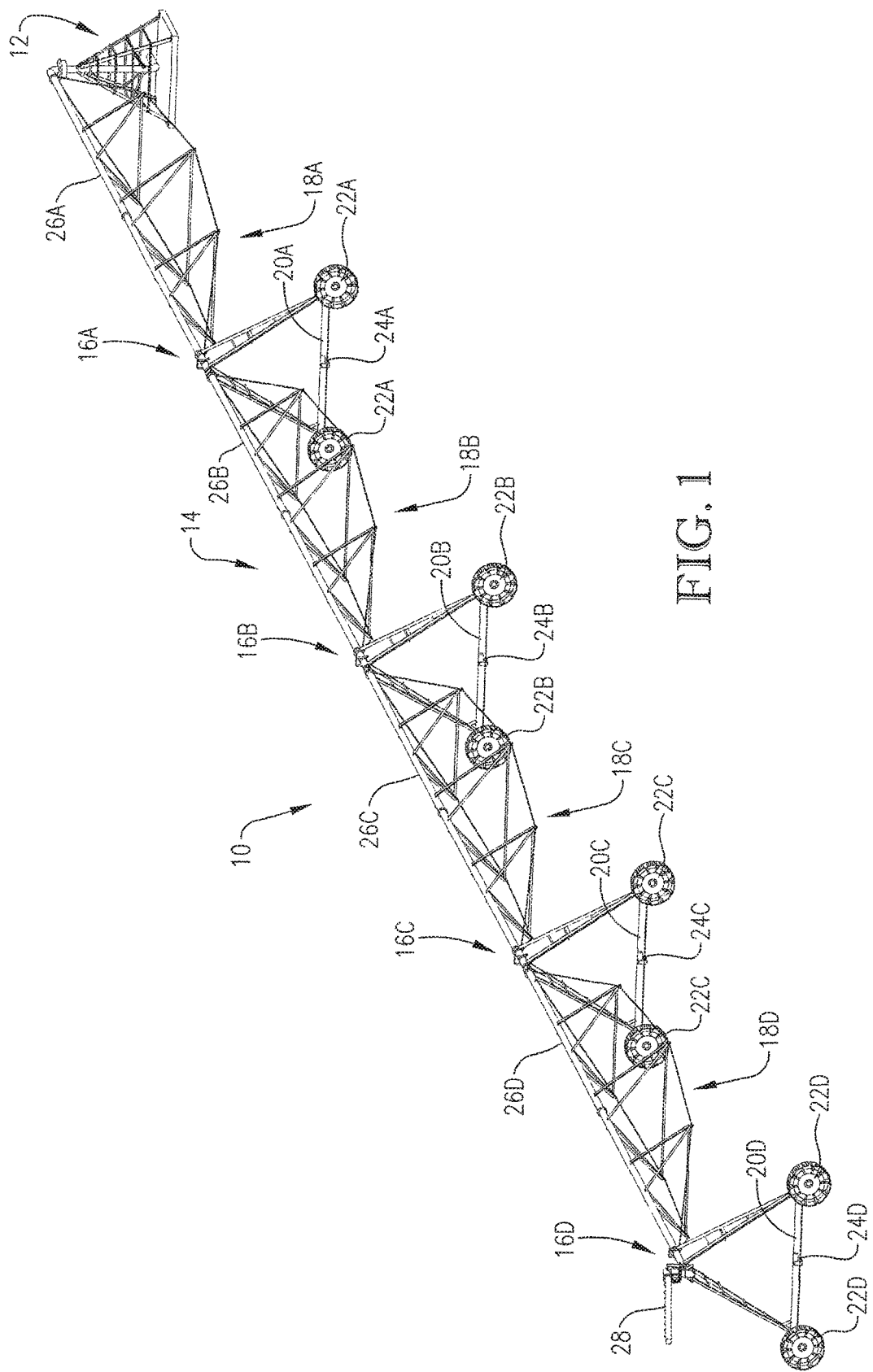
FIG. 1 is a perspective view of an exemplary irrigation system including wheel assemblies constructed in accordance with embodiments of the invention.
Figure 2:
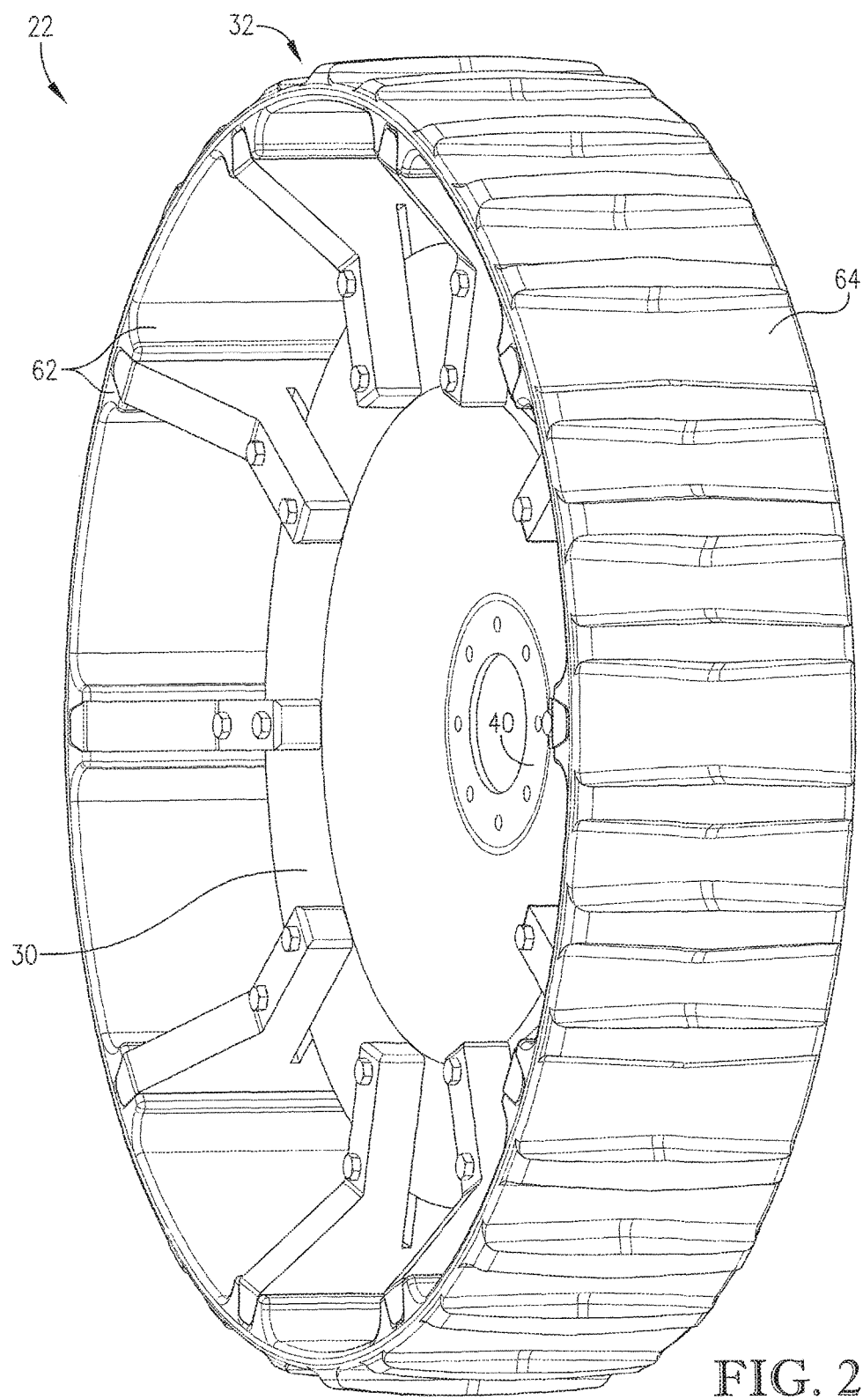
FIG. 2 is a front side perspective view of one of the wheel assemblies of FIG. 1, the wheel assembly including a collapsible wheel and a flexible airless tire mounted on the wheel.
Figure 3:
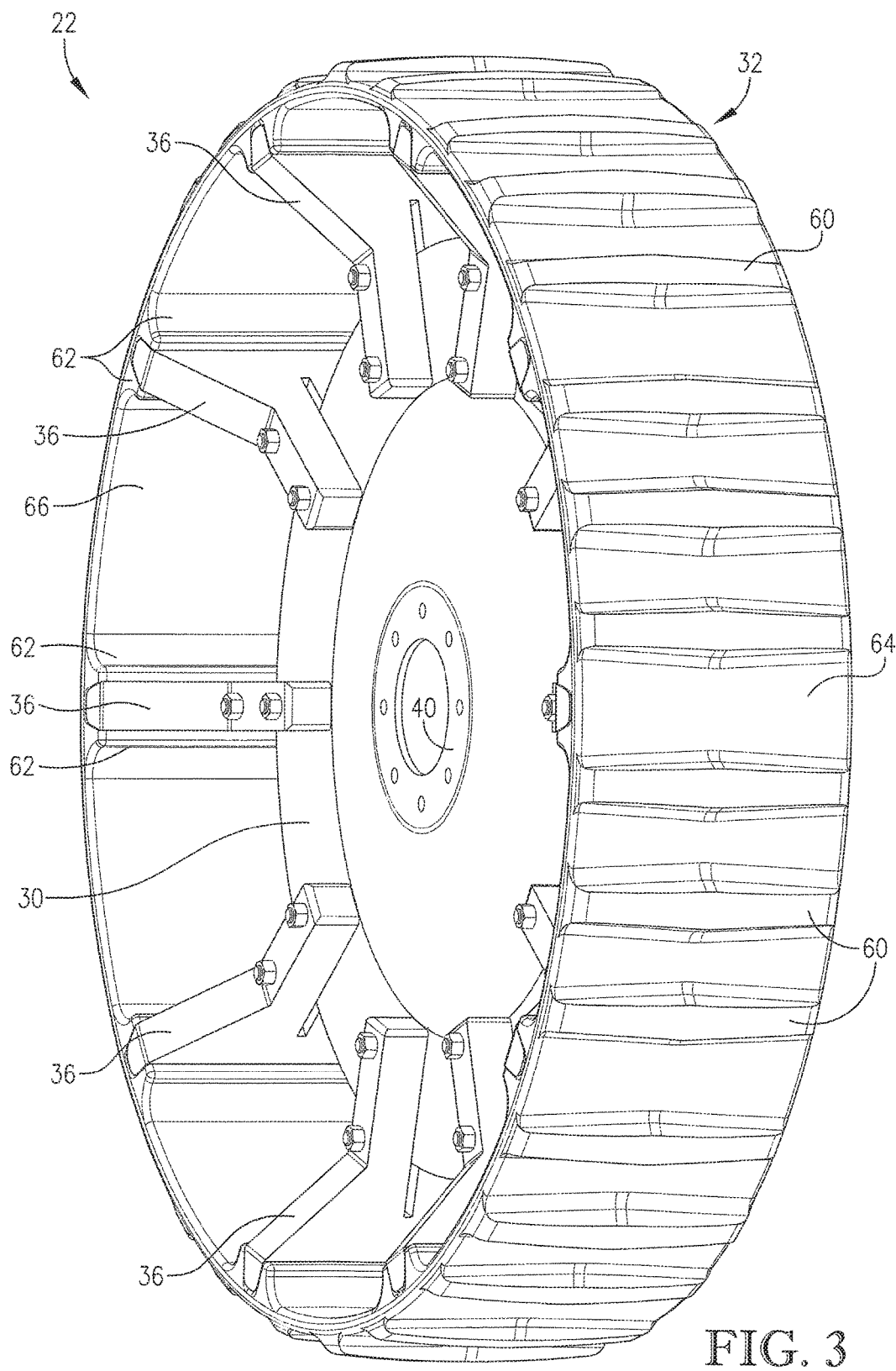
FIG. 3 is a rear side perspective view of the wheel assembly of FIG. 2.
Figure 4:
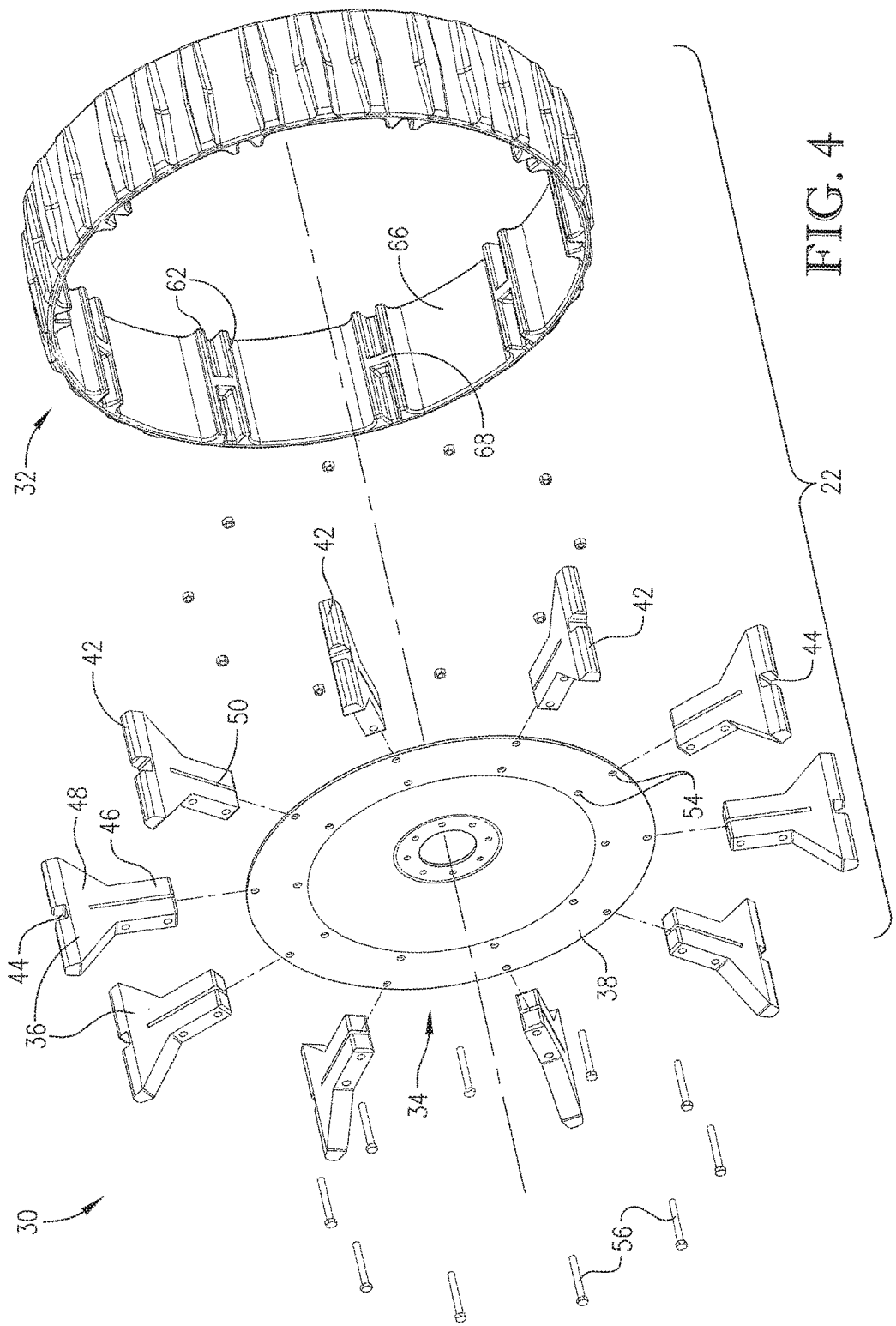
FIG. 4 is an exploded view of the wheel assembly of FIG. 2.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning now to the drawing figures, and initially FIG. 1, an irrigation system 10 constructed in accordance with embodiments of the invention is illustrated and includes a plurality of wheel assemblies. The illustrated irrigation system 10 is a central pivot irrigation system that broadly comprises a fixed central pivot 12 and a main section 14 pivotally connected to the central pivot 12. The irrigation system 10 may also comprise an extension arm (also commonly referred to as a "swing arm" or "corner arm") pivotally connected to the free end of the main section 14.

The fixed central pivot 12 may be a tower or any other support structure about which the main section 14 may pivot. The central pivot 12 has access to a well, water tank, or other source of water and may also be coupled with a tank or other source of agricultural products to inject fertilizers, pesticides and/or other chemicals into the water for application during irrigation.

The main section 14 may comprise a number of mobile support towers 16A-D, the outermost 16D of which is referred to herein as an "end tower". The support towers are connected to the fixed central pivot 12 and to one another by truss sections 18A-D or other supports to form a number of interconnected spans. The irrigation system 10 illustrated in FIG. 1 includes four mobile support towers 16A-D; however, it may comprise any number of mobile support towers without departing from the scope of the present invention.

Each mobile tower may include a drive tube 20A-D on which a pair of wheel assemblies 22A-D is mounted. Embodiments of the wheel assemblies 22A-D are described in more detail below. A drive motor 24A-D is mounted to each drive tube 20A-D for driving the wheel assemblies 22A-D. The motors 24A-D may include integral or external relays so they may be turned on, off, and reversed. The motors may also have several speeds or be equipped with variable speed drives.

Each of the truss sections 18A-D carries or otherwise supports a conduit section 26A-D or other fluid distribution mechanism that is connected in fluid communication with all other conduit sections. A plurality of sprinkler heads, spray guns, drop nozzles, or other fluid-emitting devices are spaced along the conduit sections 26A-D to apply water and/or other fluids to land underneath the irrigation system.

The irrigation system 10 may also include an optional extension arm (not shown) pivotally connected to the end tower 16D and supported by a swing tower with steerable wheels driven by a motor. The extension arm may be joined to the end tower by an articulating pivot joint. The extension arm is folded inward relative to the end tower when it is not irrigating a corner of a field and may be pivoted outwardly away from the end tower while irrigating the corners of a field.

The irrigation system 10 may also include one or more high pressure sprayers or end guns 28 mounted to the end tower 16D or to the end of the extension arm. The end guns 28 may be activated at the corners of a field or other designated areas to increase the amount of land that can be irrigated.

It will be appreciated that the irrigation system 10 is illustrated and described herein as one exemplary implementation of the wheel assemblies 22 described in detail below. Other, equally preferred implementations of the wheel assemblies 22 not shown or discussed in detail herein may include, without limitation, other types of irrigation systems, such as lateral irrigation systems, other types of agricultural equipment, such as wagons, carts, implements, and so forth, or other types of vehicles such as buses, trucks, and automobiles. However, embodiments of the invention are especially suited for irrigation systems and other vehicles or systems that travel over unpaved or unfinished ground.

Referring now to FIGS. 2-10, a wheel assembly 22 constructed in accordance with embodiments of the invention is illustrated. The wheel assembly broadly includes a wheel 30 and a flexible airless tire 32 mounted on the wheel 30 in a generally circumscribing relationship to the wheel 30. The wheel 30 is collapsible to facilitate mounting the tire on and removing the tire from the wheel 30, as explained below. As used herein, a wheel is "collapsible" if one or more of the portions of the wheel that engage the tire may be moved radially inwardly to thereby relieve tension on and/or disengage the tire.

Figure 10:
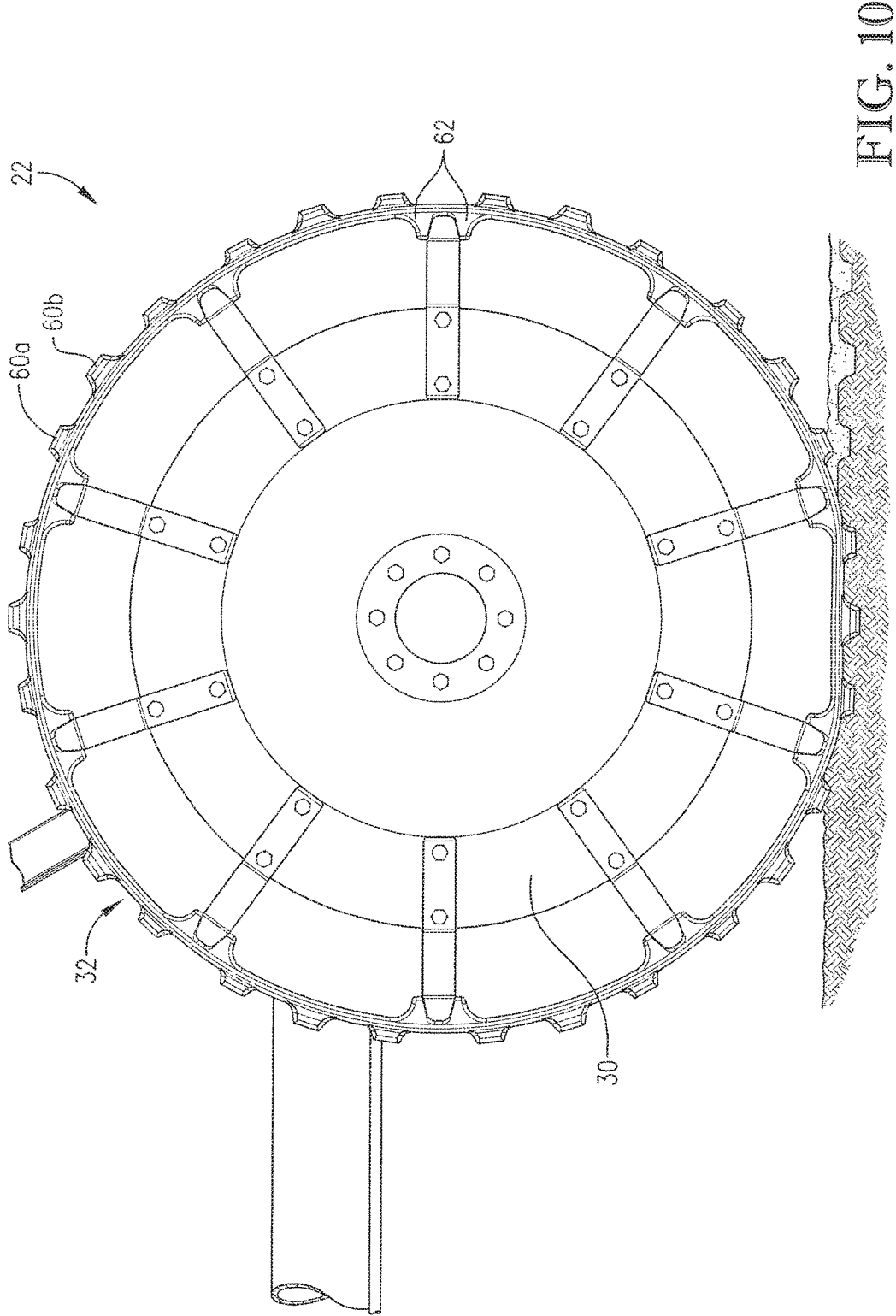
FIG. 10 is an environmental side elevation view of the wheel assembly of FIG. 2 illustrating the wheel assembly mounted on the irrigation system of FIG. 1 and engaging the ground.

The wheel 30 and the tire 32 are also configured such that the tire 32, while being airless, has some characteristics of a pneumatic tire that improve the performance of the tire. For example, the wheel 30 and tire 32 are configured such that portions of the tire 32 flex radially inwardly toward the wheel 30 in response to ground engaging pressure, as illustrated in FIG. 10. It will be appreciated that this flexing action increases the total ground engaging footprint of the wheel assembly 22, thus distributing the weight of the wheel assembly 22 and the weight of any machinery supported by the wheel assembly 22 over a larger area and limiting the total amount of ground penetration of the wheel assembly 22. Additionally, ground penetration of traction lugs or other ground-gripping elements of the tire 32 is limited, as explained below in greater detail.

As used herein, "ground engaging pressure" refers to pressure exerted on the wheel assembly 22 by the ground when the wheel assembly 22 is at rest on the ground or rolling on the ground. Ground engaging pressure may include pressure exerted on the wheel assembly 22 from different directions or from multiple directions simultaneously, such as where the wheel assembly 22 is on inclined terrain or rolling over an obstacle. Ground engaging pressure is related to the weight of the wheel assembly 22 and to the weight of any machinery supported by the wheel assembly 22, and thus will vary from one embodiment of the invention to another and from one implementation to another.

The wheel 30 is configured to engage the tire 32 at circumferentially spaced locations such that portions of the tire 32 between the points of engagement flex radially inwardly in response to ground engaging pressure. In the illustrated embodiment, the wheel 30 includes a disc shaped inner portion 34 and a plurality of circumferentially spaced mounting elements 36 movably attached to a radially outer margin 38 of the inner portion 34. The inner portion 34 of the wheel 30 includes an innermost hub 40 with a plurality of apertures for attaching to, for example, lug nuts or similar attachment components.

Each of the mounting elements 36 is movable between a retracted position (FIGS. 5 and 7) and an extended position (FIGS. 6 and 8) Each of the mounting elements 36 presents an elongated, transversely oriented radially outer edge 42. When the mounting elements 36 are in the extended position, the outer edges 42 are distal the inner portion 34 and engage the tire 32 to thereby support the tire 32 relative to the wheel 30. When the mounting elements 36 are in the retracted position, the outer edges 42 are proximate the inner portion 34. As illustrated, the length of the outer edge 42 is approximately the same as the width of the tire 32. Furthermore, the outer edge 42 defines a gap 44 configured to engage a portion of the tire 32 to prevent the tire 32 from shifting laterally relative to the wheel 30, as explained below.

Figure 5:
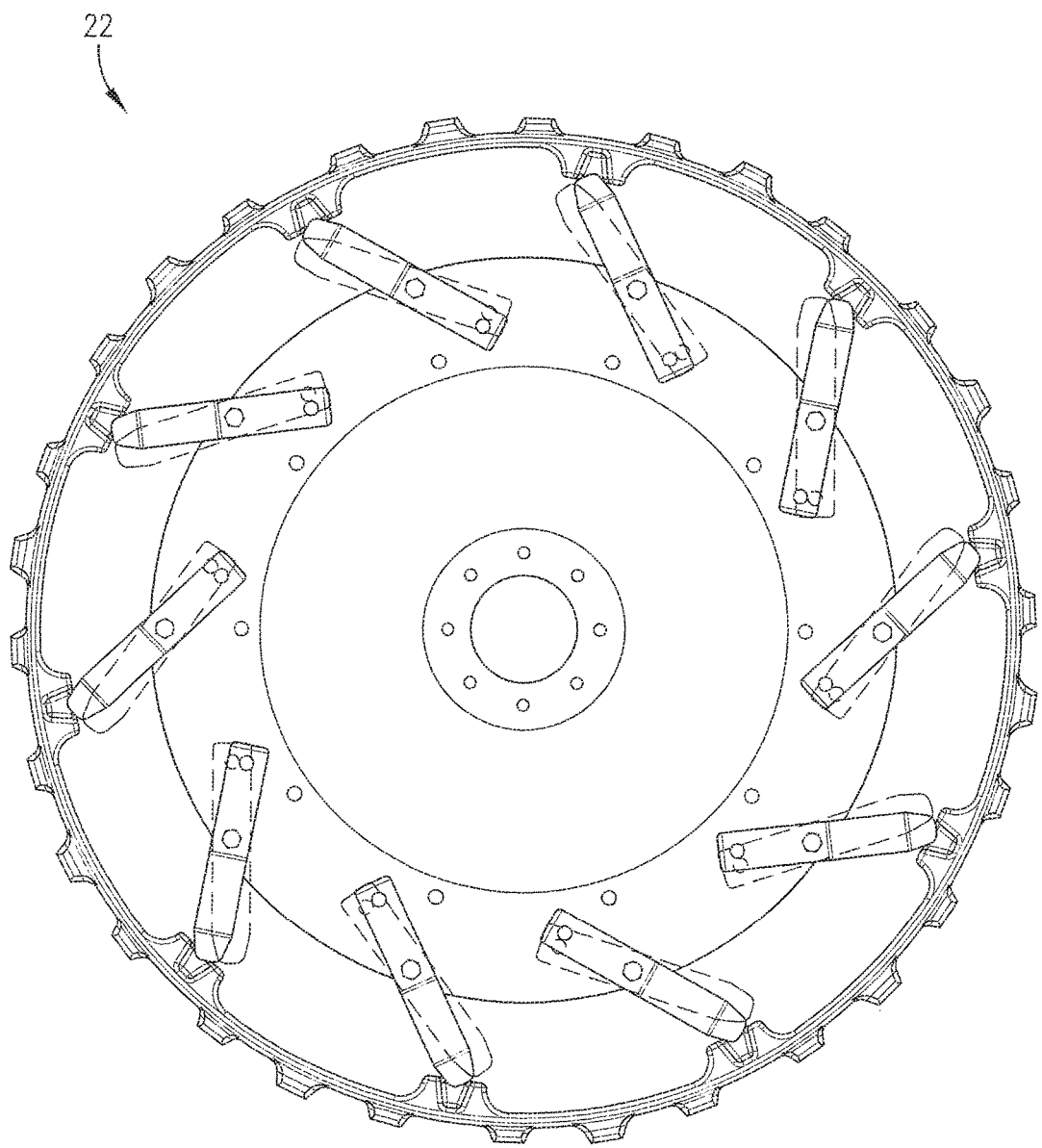
FIG. 5 is a side elevation view of the wheel assembly of FIG. 2, illustrating a plurality of mounting elements in a retracted position.
Figure 6:
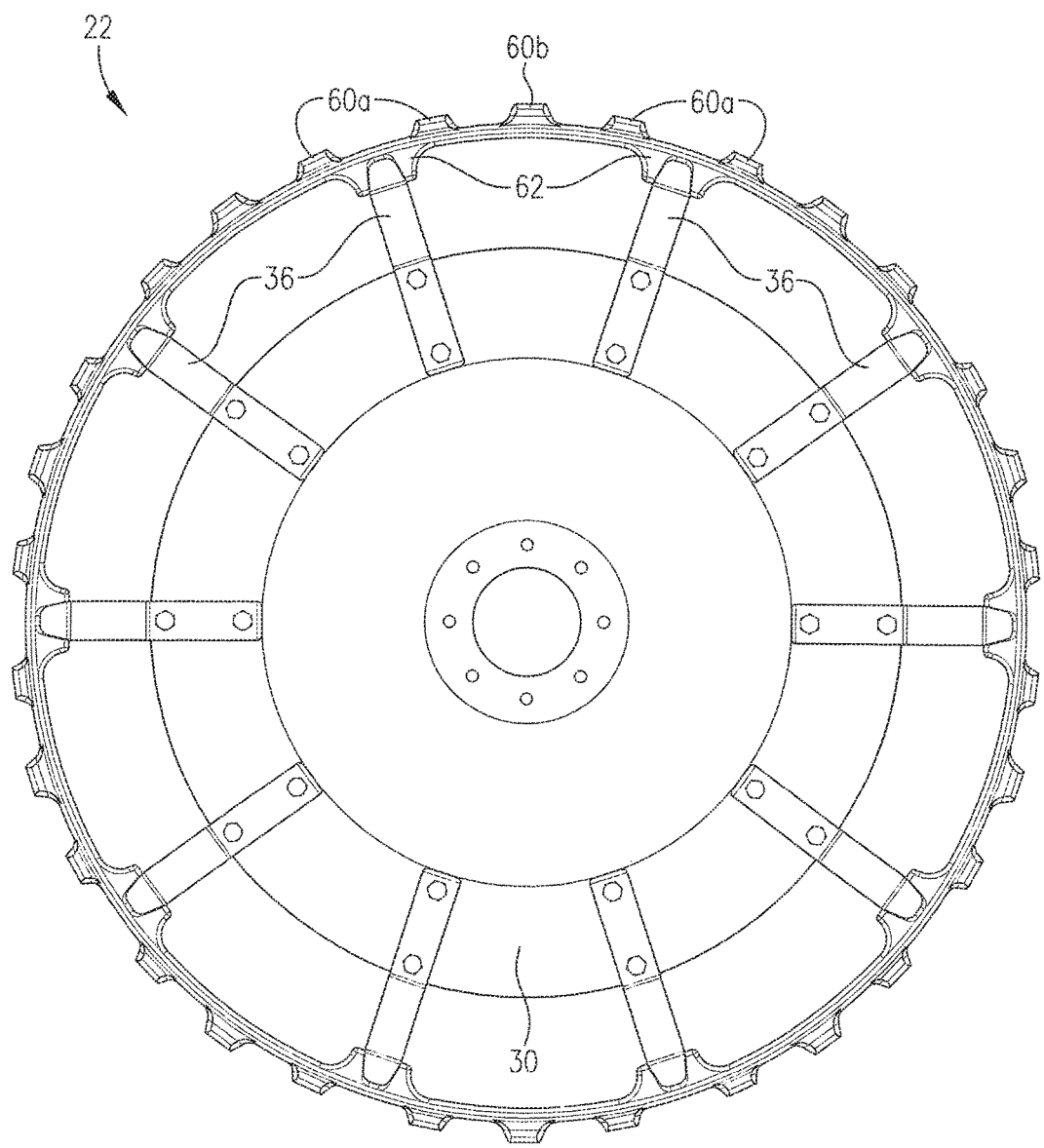
FIG. 6 is a side elevation view of the wheel assembly of FIG. 2, illustrating the plurality of mounting elements in an extended position and engaging the tire.
Figure 7:
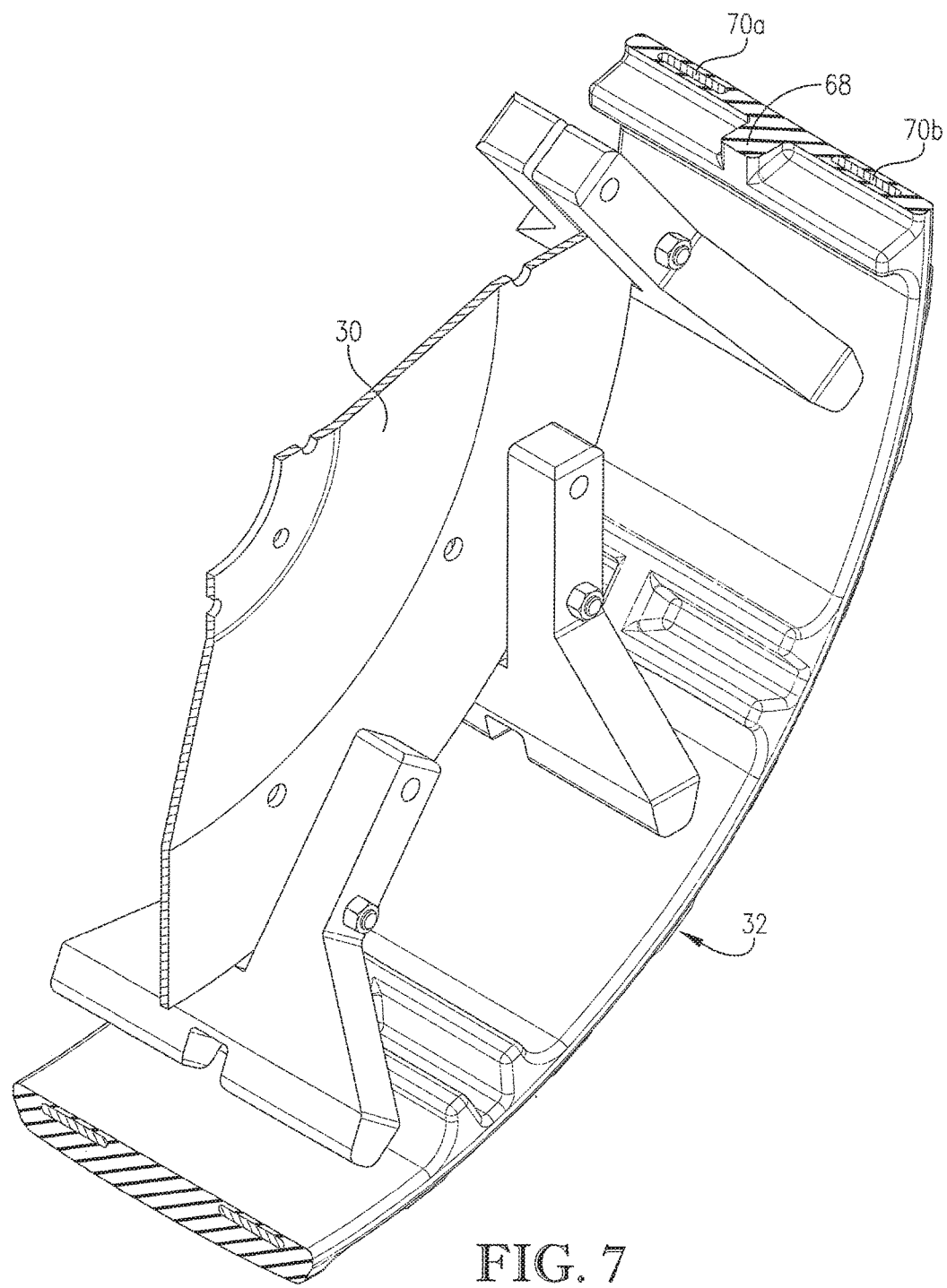
FIG. 7 is a fragmentary view of the wheel assembly of FIG. 2, illustrating the mounting elements in the retracted position.
Figure 8:
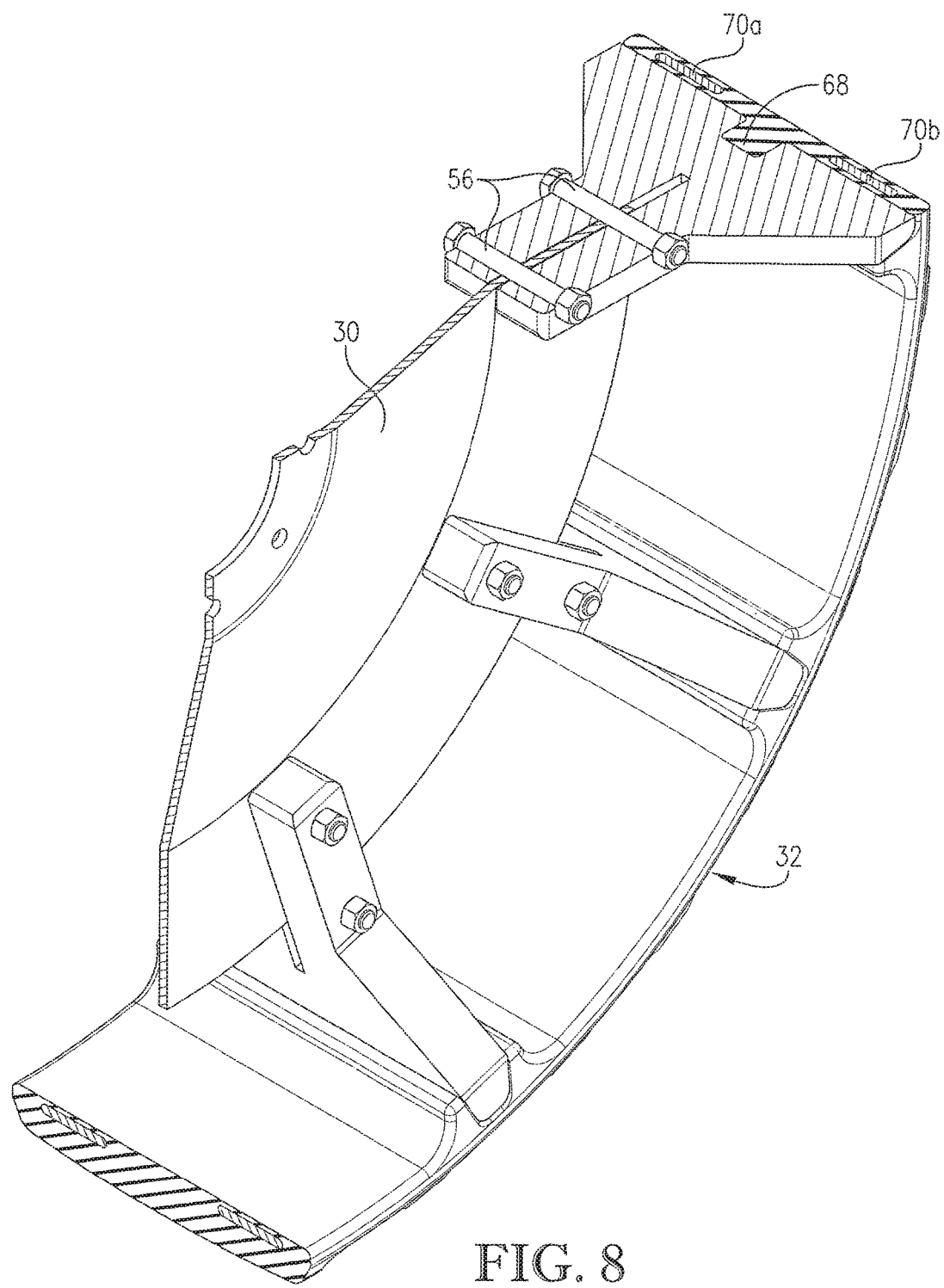
FIG. 8 is a fragmentary view of the wheel assembly of FIG. 2, illustrating the mounting elements in the extended position.
Figure 9:
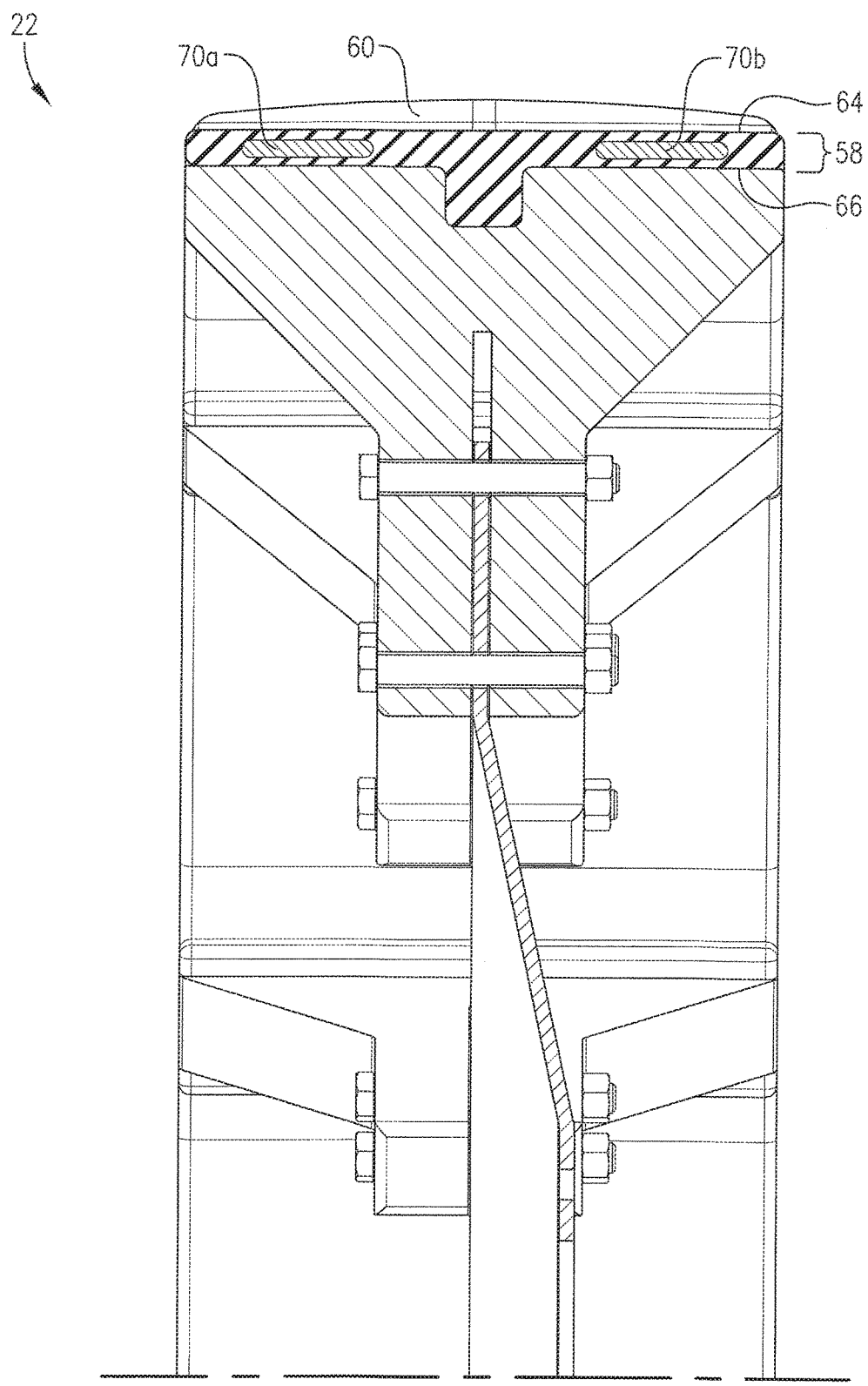
FIG. 9 is a fragmentary, cross-sectional view of the wheel assembly of FIG. 2.

In the illustrated embodiment, each of the mounting elements 36 presents a Y-shape with a lower portion 46 configured to attach to the outer margin 38 of the wheel 30 and a widening upper portion 48 including the outer edge 42 configured to engage the tire 32. A slot 50 in the lower portion 46 enables the mounting element 36 to slidingly engage the outer margin 38 of the wheel 30, and a pair of through-holes 52 in the lower portion 46 of each mounting element 36 align with a corresponding pair of apertures 54 in the outer margin 38 of the wheel 30. Bolts 56 or similar connectors are inserted through the through-holes and the apertures 52 to secure the mounting elements 36 to the inner portion 34 of the wheel 30. As illustrated in FIGS. 5 and 6, by removing an innermost one of the bolts 56, the mounting elements 36 are permitted to pivot about the other one of the bolts 56, wherein the mounting element 36 is movable between the retracted position (FIG. 5) and the extended position (FIG. 6).

Each mounting element 36 may be constructed of a single, unitary piece of material, such as metal, that is folded, cast or otherwise formed to the desired shape and configuration. Furthermore, all of the mounting elements 36 may be identical in size and shape. By way of example, each of the mounting elements 36 may be constructed by cutting a piece of metal to a particular flat shape and then forming the piece of metal to the desired shape through a series of bending and forming steps. Alternatively, each of the mounting elements may comprise two or more parts assembled to form a single structure.

The mounting elements 36 are approximately equally spaced around the inner portion 34 of the wheel 30 and extend radially outwardly from the inner portion 34. When the tire 32 is mounted on the wheel 30 and the mounting elements 36 are in the extended position, the mounting elements 36 engage portions of the tire 32 such that the tire 32 is separated radially from the inner portion 34 of the wheel 30 by a space. This configuration allows portions of the tire 32 to flex inwardly toward the central portion 34 in response to ground engaging pressure, as explained above. As used herein, the mounting elements 36 extend radially outwardly from the inner portion 34 if at least a portion of each of the mounting elements 36 is positioned radially outwardly of the inner portion 34 of the wheel 30.

In the illustrated embodiment, the wheel assembly 22 includes ten mounting elements 36 approximately equally spaced around the outer margin 38 of the wheel 30. If the wheel 30 includes ten mounting elements 36 (as illustrated), the angular separation of the mounting elements 36 is approximately thirty-six degrees. Thus, if the wheel 30 is about forty-eight inches in diameter at the edges 42, the outer edges 42 of the mounting elements 36 are spaced approximately twelve and one-half inches apart. If the wheel 30 is about fifty inches in diameter at the outer edges 42, the mounting elements 36 are spaced approximately thirteen inches apart at the outer edges 42. If the wheel 30 is about twenty-four inches in diameter at the outer edges 42, the mounting element 36 pairs are spaced approximately six inches apart at the outer edges 42.

The tire 32 is configured to be mounted on the wheel 30 such that at least a portion of the tire 32 engages the mounting elements 36 and the tire 32 presents a generally circular or nearly circular outer profile. Advantageously, the wheel 30 is configured for use with an airless tire. As used herein, a "tire" is a flexible component positioned and configured to engage the ground during use of the wheel assembly 22, An "airless tire" is a tire that does not require trapped or compressed air for normal and proper use. An airless tire may be constructed of a single, unitary piece of material or multiple pieces of material. As explained above and illustrated in FIG. 10, the tire 32 is configured to flex inwardly in response to ground engaging pressure. As used herein, the tire 32 can "flex" if it can deflect or bend repeatedly and return to its original shape.

The illustrated tire 32 includes a body 58 that is generally cylindrical in shape with a plurality of traction lugs 60 extending radially outwardly from an outer side of the body 58 and a plurality of drive lugs 62 extending radially inwardly from an inner side of the body 58. In the illustrated embodiment, the outer side 64 of the tire body 58 is generally transversely flat, that is, the outer side of the body presents little or no curvature from a first edge to a second edge of the tire. Similarly, the inner side 66 of the tire body 58 is also generally transversely flat.

The traction lugs 60 engage the ground and help prevent the wheel assembly 22 from slipping relative to the ground. The illustrated traction lugs 60 are generally rectangular or trapezoidal in shape and transversely oriented on the tire 32, are integrally formed with the tire 32 and may be approximately equally spaced circumferentially around the outer side 64 of the tire body 58. As illustrated in FIG. 6, the tire 32 may be configured such that the traction lugs 60 are positioned intermediate the mounting elements 36. This configuration allows the portion of the tire 32 bearing the traction lug 60 to flex inwardly in response to ground engaging pressure. This performance characteristic allows each traction lug 60 to engage the ground, yet limits the amount of ground penetration and soil disturbance. It may be desirable in some implementations to position the traction lugs 60 proximate or in direct radial alignment with the mounting elements 36. Such alternative configurations of the tire 32 are within the ambit of the present invention.

As illustrated in FIG. 6, certain traction lugs 60b may be larger (i.e., have a greater radial reach) than other traction lugs 60a. In the illustrated embodiment, one of every three traction lugs has a greater radial reach, corresponding to a position that is approximately half the distance between consecutive mounting elements 36. Thus, there are three traction lugs between consecutive mounting elements 36, with the middle traction lug being the largest.

The drive lugs 62 engage the wheel 30 and prevent the tire 32 from shifting longitudinally or laterally on the wheel 30. In the illustrated embodiment, the drive lugs 62 are arranged in pairs corresponding to the mounting elements 36 such that the drive lugs 62 are adjacent the mounting elements 36 on opposite sides of the mounting elements 36. Each of the drive lugs 62 is integrally formed in the tire 32 and presents a generally elongated body with a cross member 68 connecting each drive lug 62 pair. Each of the cross members 68 is located at a center of the tire 32 and corresponds to the gap 44 defined by the outer edge 42 of the mounting elements 36.

The tire 32 is constructed of a flexible material, such as rubber, PVC or plastic. The tire 32 may be configured such that as the tire flexes inwardly toward the wheel 30, the flexed portion of the tire 32 remains transversely flat or substantially transversely flat. This may be desirable, for example, to preserve a wide footprint or otherwise limit the amount of ground penetration, With particular reference to FIGS. 7-9, one or more tension elements 70 may be secured to the tire 32 to give the tire 32 added structural strength and resilience. As used herein, a tension element 70 is "secured to" the tire 32 if it is partially or completely embedded in the tire 32 or otherwise attached or connected to the tire 32. A first tension element 70a may be placed in a first axial side of the tire body 58 and a second tension element 70b may be placed in a second axial side of the tire body 58. Alternatively, a single tension element may be located in a central portion of the tire 32, The tension elements 70 are preferably completely embedded in the tire 32, as illustrated.

The tension elements 70 are preferably more resilient than the material used to construct the tire 32 such that the one or more tension elements 70 increase the overall resilience of the tire 32, strengthening the structure of the tire 32 and enabling the tire 32 to return to its original shape after being subject to deflection during use. The one or more tension elements 70 may be constructed of metal, such as spring steal, or other resilient and durable material. More particularly, each of the tension elements 70 may be a metal band constructed of a solid piece of metal or of multiple bonded or braided metal elements. The tension elements 70 may present a width that is between 0.05 and 0.5 times a total width of the tire, such as 0.1, 0.2 or 0.3 times the total width of the tire. If the tire 32 is twelve inches wide, for example, each of the tension elements 70 may be about two or two and one-half inches wide and between one-eighth and one-half of an inch thick.

The wheel 30 is constructed of a rigid material such as, for example, metal, plastic or a composite material. The size of the wheel assembly 22 may vary substantially from one embodiment of the invention to another without departing from the scope of the invention. It will be understood that the dimensions and ranges set forth herein are exemplary, and not limiting, in nature. The diameter of the wheel 30 is preferably within the range of from about twenty-four inches to about sixty inches and more preferably within the range of from about thirty-six inches to about forty-eight inches. The width of the wheel 30 (i.e., the total width of each of the mounting elements 36) is preferably within the range of from about six inches to about eighteen inches and more preferably within the range of from about eight inches to about sixteen inches. The diameter of the inner portion 34 of the wheel 30 is preferably between about 0.6 and 0.9 times the total diameter and may particularly be about 0.8 times the total diameter.

The thickness of the tire body 58 is preferably within the range of from about one-half inch to about three inches, more preferably within the range of from about one inch to about two inches. The height of the traction lugs 60 is preferably within the range of from about one-quarter inch to about four inches, more preferably within the range of from about one-half inch to about three inches. In one exemplary embodiment, the wheel assembly 22 is about eleven inches wide and about fifty-two inches in diameter. The tire body preferably presents a width to thickness ratio of between five and twenty.

The collapsible configuration of the wheel facilitates mounting the tire 32 on the wheel 30 an removing the tire 32 from the wheel 30. To mount the tire 32 on the wheel 30, for example, one or more of the mounting elements 36 are placed in the retracted position to facilitate placement of the tire 32 on the wheel 30. In the illustrated embodiment, the mounting elements 36 are placed in the retracted position by removing one of the bolts 56 and allowing the mounting elements 36 to pivot about the remaining bolt 56. It may be desirable to place all or most of the mounting elements 36 in the retracted position, but it will be appreciated that in some circumstances placing as few as one of the mounting elements 36 in the retracted position is sufficient to accommodate placement of the tire 32 on the wheel 30.

When the tire 32 is placed on the wheel 30, the mounting elements 36 are moved from the retracted position (FIGS. 5 and 7) to the extended position (FIGS. 6 and 8), thereby causing the mounting elements 36 to firmly engage the tire 32 and secure the tire 32 on the wheel 30.

Although the invention has been described with reference to the preferred embodiment illustrated in the attached drawing figures, it is noted that equivalents may be employed and substitutions made herein without departing from the scope of the invention as recited in the claims. By way of example, the particular configuration of the mounting elements 36 that enables movement between the retracted and the extended positions may vary from one embodiment of the invention to another without departing from the spirit or scope of the invention. In addition to the pivoting configuration illustrated and described herein, the mounting elements 36 may be configured to slide or otherwise move between the extended and retracted positions.

Having thus described the preferred embodiment of the invention, what is claimed as new and desired to be protected by Letters Patent includes the following:

1. A wheel assembly for an irrigation system, the wheel assembly comprising:
   a wheel including:
      a central portion;
      a plurality of circumferentially spaced mounting elements attached to the central portion, each of the mounting elements being formed of a single, unitary piece of material and being pivotable about a pivot axis extending parallel with an axis of rotation of the wheel between a retracted position and an extended position; and,
      a plurality of first fasteners and a plurality of second fasteners, the plurality of first fasteners being configured to pivotably connect the mounting elements to the wheel when the plurality of second fasteners are not attached to the wheel, the plurality of first fasteners and the plurality of second fasteners being cooperatively configured to non-pivotably secure the mounting elements to the wheel when the plurality of first fasteners and the plurality of second fasteners are attached to the wheel; and
   an airless flexible tire configured to be mounted on the mounting elements when the mounting elements are secured in the extended position, portions of the airless flexible tire located between the mounting elements being configured to flex inwardly when subject to ground engaging pressure.

2. The wheel assembly as set forth in claim 1, each of the mounting elements being configured to pivot independently of the other mounting elements.

3. The wheel assembly as set forth in claim 1, wherein the tire engages the mounting elements when the mounting elements are in the extended position such that portions of the tire not engaging the mounting elements are separated radially from the wheel by a space, the portions of the tire not engaging the mounting elements being configured to flex inwardly toward the wheel when subject to ground engaging pressure.

4. The wheel assembly as set forth in claim 1, each of the mounting elements presenting an elongated, transversely oriented outer edge that engages the tire.

5. The wheel assembly as set forth in claim 1, the tire including a pair of drive lugs positioned to engage opposite sides of one of the mounting elements, the drive lugs extending radially inwardly from the tire.

6. The wheel assembly as set forth in claim 1, the tire including a plurality of traction lugs extending radially outwardly from the tire.

7. The wheel assembly as set forth in claim 1, the tire including one or more tension elements secured thereto.

8. The wheel assembly as set forth in claim 7, wherein the one or more tension elements are at least partially embedded in the tire.

9. An irrigation system comprising:
a conduit for carrying and dispensing water;
at least one mobile tower for supporting and moving the conduit; and
a plurality of wheel assemblies for supporting the at least one mobile tower, each of the wheel assemblies including:
a wheel with a central portion and a plurality of circumferentially spaced mounting elements attached to the central portion, each of the mounting elements being formed of a single, unitary piece of material and being pivotable about a pivot axis extending parallel with an axis of rotation of the wheel between a retracted position and an extended position; and,
a plurality of first fasteners and a plurality of second fasteners, the plurality of first fasteners being configured to pivotably connect the mounting elements to the wheel when the plurality of second fasteners are not attached to the wheel, the plurality of first fasteners and the plurality of second fasteners being cooperatively configured to non-pivotably secure the mounting elements to the wheel when the plurality of first fasteners and the plurality of second fasteners are attached to the wheel; and
an airless flexible tire configured to be mounted on the mounting elements when the mounting elements are secured in the extended position, portions of the airless flexible tire located between the mounting elements being configured to flex inwardly when subject to ground engaging pressure.

10. The irrigation system as set forth in claim 9, each of the mounting elements being configured to pivot independently of the other mounting elements.

11. The irrigation system as set forth in claim 9, wherein the tire engages the mounting elements when the mounting elements are in the extended position such that portions of the tire not engaging the mounting elements are separated radially from the wheel by a space, the portions of the tire not engaging the mounting elements being configured to flex inwardly toward the wheel when subject to ground engaging pressure.

12. The irrigation system as set forth in claim 9, each of the mounting elements presenting an elongated, transversely oriented outer edge that engages the tire.

13. The irrigation system as set forth in claim 9, the tire including a pair of drive lugs positioned to engage opposite sides of one of the mounting elements, the drive lugs extending radially inwardly from the tire.

14. The irrigation system as set forth in claim 9, the tire including a plurality of traction lugs extending radially outwardly from the tire.

15. The irrigation system as set forth in claim 9, the tire including one or more tension elements secured thereto.

16. The irrigation system as set forth in claim 15, wherein the one or more tension elements are at least partially embedded in the tire.

\* \* \* \* \*